United States Patent [19]

Zoula

[11] 4,207,664

[45] Jun. 17, 1980

[54] PULLING TOOL FOR EXTRACTING BUSHINGS AND BEARINGS

[76] Inventor: Louis Zoula, 8528 Horizon Dr., Burlington, Wis. 53105

[21] Appl. No.: 932,002

[22] Filed: Aug. 8, 1978

[51] Int. Cl.$^2$ .................... B23P 19/04

[52] U.S. Cl. .................... 29/264; 29/265

[58] Field of Search .................... 29/263, 264, 265

[56] References Cited

U.S. PATENT DOCUMENTS

| | | | |
|---|---|---|---|
| 1,525,274 | 2/1925 | Day | 29/263 |
| 1,658,896 | 2/1928 | Hays | 29/264 |
| 2,290,427 | 7/1942 | Harrington | 29/265 |
| 2,305,076 | 12/1942 | Graham | 29/263 |
| 3,055,093 | 9/1962 | Ruble | 29/265 |

*Primary Examiner*—James L. Jones, Jr.

*Attorney, Agent, or Firm*—Leonard J. Kalinowski

[57] ABSTRACT

A pulling tool for extracting bushings, bearings or similar devices from a blind hole consists of first and second pulling members and a drive member. The pulling members are inserted into a central recess of a bushing or bearing, and a threaded shank portion of the drive member is inserted into an axial opening between the pulling members, engaging threaded inner surfaces of the pulling members and moving the pulling members apart to cause lip portions at the inner ends of the pulling members to be driven behind the bottom edge of the bushing or bearing. As the drive member is turned, the pulling members back up onto the drive member, carrying with them the bushing or bearing. One of the pulling members has a recess on a side surface of its outer end to receive a tool for preventing rotation of the pulling members relative to the drive member when the pulling tool is used to remove a bearing. Alternatively, the outer ends of the pulling members form a hex configuration which can be gripped by an open ended wrench.

3 Claims, 7 Drawing Figures

PULLING TOOL FOR EXTRACTING BUSHINGS AND BEARINGS

BACKGROUND OF THE INVENTION

1. Field of the Invention

This invention relates to bushing and bearing pullers, and more particularly to bushing and bearing pullers for extracting bushings and bearings from blind holes.

2. Description and Prior Art

Various types of pulling devices have been proposed for removing bushings or bearings from blind holes. One such device, shown in the U.S. Pat. No. 2,305,076 to G. M. Graham, is intended for extracting a bushing or outer bearing race from a blind hole. The device includes two jaw elements which are receivable within the center recess of the bearing race. Each jaw element has an outer tapered face terminating in a lip which is moved to engage the bottom surface of the bearing race to be extracted when the jaw elements are driven apart. The inner faces of the two jaw elements are shaped and threaded complementary to each other providing an axial opening to receive a threaded shaft of a drive member which when turned moves downwardly into the jaws driving them apart and causing them to back out of the recess and carry with them the bearing race.

The two jaw members are interconnected by pins which are received in complementary recesses formed in the jaw elements. The pins permit relative movement of the jaw members toward and away from one another to facilitate positioning of the jaw elements in the recess of the bearing race, and prevent axial misalignment of the elements as the drive member is turned into the jaw elements.

This device has limited application. Since the device relies on the stationary bushing or bearing cup to prevent rotation of the jaw elements while the drive member is being turned, this puller could not be used to extract a bearing by engaging its inner race. Also, the interconnection of the two jaw members by pins requires special machining operations to form the apertures in the edges of the jaw elements, and to form the pins and connect them to the jaw members. It would appear that the machining and assembly costs related to the use of these pins would account for a considerable portion of the overall cost for the pulling device.

In the U.S. Pat. No. 2,618,053 to M. Claps there is disclosed a bushing puller which includes two pulling members, a drive shaft and a thrust block. The pulling members have slots arranged to receive the pins carried by the thrust block to establish a connection between the thrust block and the pulling members while the drive member is turned into the thrust block to extract the bushing.

Although the machining and assembly of this bushing puller is simpler than that for the pulling tool provided by Graham, the bushing puller shown by Claps requires an additional member in the form of the thrust block. Also, the device appears to be suitable only for extracting bushings and outer bearing races from blind holes as is the device provided by Graham.

SUMMARY OF THE INVENTION

The present invention provides a pulling tool for extracting bushings, bearings, or similar devices from a blind hole. The pulling tool consists of only three parts namely first and second pulling members, and a drive member. As will be shown, the pulling tool is of simple construction and easy to manufacture, resulting in a low cost unit which is easy to use. A major distinction between the pulling tool of the present invention and prior art pulling tools employing a "split" puller assembly is that the pulling members are not mechanically linked together as by pins or mechanically linked to a thrust block when used to extract a bushing or bearing. Also, the pulling tool provided by the present invention can be used to extract bearings while engaging the moveable inner race thereof as well as to extract bushings or the outer race of a bearing. Known pulling tools employing a "split" configuration pulling assembly have heretofore been limited to applications in extracting bushings or the outer race of a bearing from a blind hole.

In the pulling tool provided by the present invention, each pulling member is an elongated generally semi-cylindrical element. The radius of curvature of the pulling members is slightly less than that of a semi-cylinder to permit the two pulling members to be received in a central recess of the bushing or bearing to be extracted. When the longitudinal edges of the pulling members are placed in engagement, an axial opening is provided between the members for receiving a threaded shank portion of the drive member which engages complementary threaded inner surfaces of the pulling members. When the drive member is inserted into the axial opening provided by the two pulling members, the pulling members are moved apart causing lip portions which extend outwardly from the inner ends of the pulling members to be driven between the bottom edge of the bushing or bearing and the blind wall of the housing. The edges of the lip portions are tapered to facilitate insertion of the tool into the central recess of the bushing or bearing. As the drive member is turned into the pulling members, the pulling members are backed up onto the drive member carrying with them the bushing or bearing.

One of the pulling members has a recess on the side surface of its head portion to receive a tool to prevent rotation of the pulling members relative to the drive member during extraction of a bearing. Alternatively, the head portion of the two pulling members may form a generally hex configuration which can be gripped by an open ended wrench while the drive member is being turned.

As indicated above, the pulling tool provided by the present invention is simple in construction and easy to manufacture. To form the pulling members, a single element of bolt-like configuration is drilled through axially and then tapped over part of the shank portion. The tip of the shank portion is rolled over to form a lip, and the element thus formed is split into two parts to provide the two pulling members. The edges of the lip portion are then tapered as by grinding. The drive member may comprise a conventional cap screw or hex head bolt.

Thus, the pulling tool provided by the present invention is of simple construction and requires a minimum number of parts namely two pulling elements and a drive bolt. Also, manufacture of the pulling tool is simple with the major machining operations consisting of drilling an axial hole through bolt stock, tapping a portion of the hole and splitting the bolt stock to provide the two pulling elements. The minimum number of parts and simple manufacturing techniques result in a low cost pulling tool. Also, the pulling tool is suitable for removing virtually any type of bearing (while engaging the inner races thereof) or bushing from a blind hole. Other features of the invention will become apparent from the detailed description which follows and makes reference to the following drawings:

DESCRIPTION OF PREFERRED EMBODIMENTS

Figure 4:
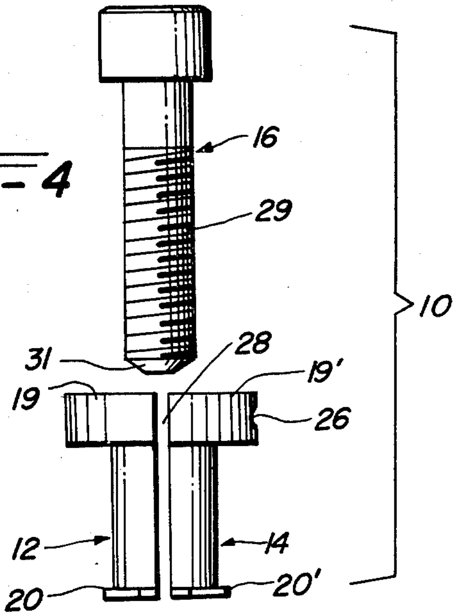
FIG. 4 is an exploded view of the pulling tool shown in FIG. 1.
Figure 5:
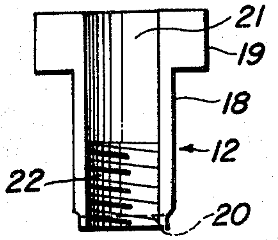
FIG. 5 is a rear elevational view of a pulling member of the pulling tool.
Figure 6:
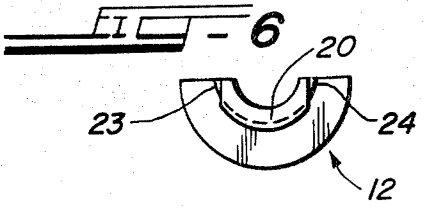
FIG. 6 is a bottom view of the pulling member shown in FIG. 6.

Referring first to FIG. 4, the pulling tool 10 provided by the present invention includes only three parts, namely a pair of pulling members 12 and 14 and a drive member 16. The pulling members 12 and 14 are basically identical in shape, each being elongated and generally semi-cylindrical in shape as shown best in FIGS. 5 and 6 which shows the configuration of pulling member 12. The member 12 has a shank 18 terminating in a flange or head 19 at one end and having a peripheral lip 20 (FIG. 4) extending outwardly from its other end. The member 12 has an axial channel 21 of arcuate configuration which has threads 22 formed on a portion of the shank 18 adjacent to its bottom end and extending approximately half the length of the channel 21. As shown best in FIG. 6, the ends of the lip portion are tapered at points 22 and 23 to facilitate the engagement of the peripheral lip 20 with the inner recess of a bushing, or bearing, to be extracted.

Pulling member 14 is generally similar to pulling member 12 except that its threads are complementary to those of member 12. Accordingly, corresponding portions have been given the same reference number with a prime notation. In addition, pulling member 14 has an aperture 26 (FIG. 4) formed in the side surface of its head 19' to receive a tool to prevent rotation of the pulling members relative to the drive member when the pulling tool is used to extract a bearing.

The pulling members 12 and 14 are formed from a single element of bolt-like configuration. The bolt stock is drilled through axially and tapped. Then the bottom end of the shank is rolled over to form the lip, and the element thus formed is split along its longitudinal axis to form the two pulling members. The edges of the lip portions are then tapered in a suitable manner, such as by a grinding operation.

Referring again to FIG. 4, when the two pulling members 12 and 14 are positioned with their longitudinal edges in opposition, an axial opening 28 is provided between the members for receiving a threaded shank port on 29 of the drive member 16 which may comprise a conventional cap screw or hex head bolt.

Figure 1:
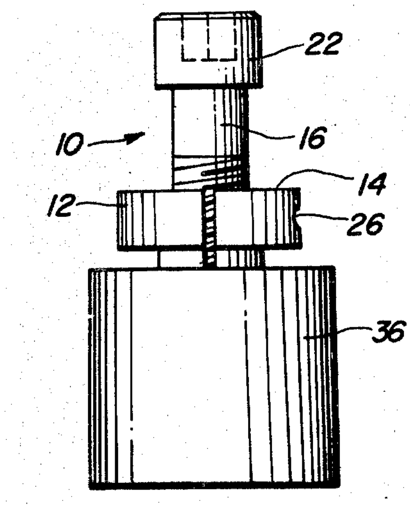
FIG. 1 is a front elevation view of one embodiment for a pulling tool provided by the present invention and which is shown in an application for extracting a bushing from a blind hole.
Figure 2:
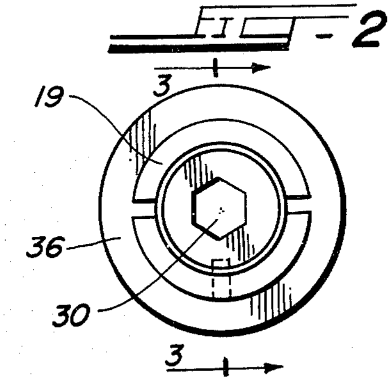
FIG. 2 is a top plan view of the pulling tool shown in FIG. 1.
Figure 3:
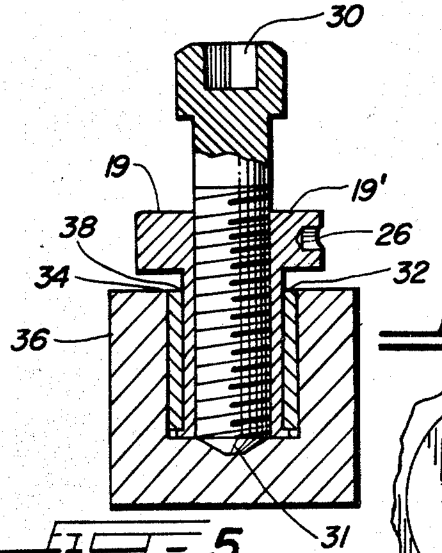
FIG. 3 is a sectional view of the pulling tool taken along lines 3—3 of FIG. 2.
Figure 8:
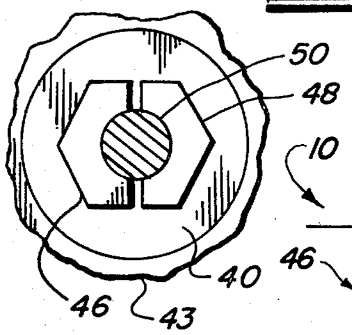

Referring to FIGS. 1-3, the pulling tool 10 is shown used to remove a bushing 32 (FIG. 3) from a blind hole 34 in a housing or bushing block 36. In removing the bushing 32 from the hole 34, first the two pulling members 12 and 14 are inserted into the center recess 38 of the bushing. The radius of curvature of the pulling members 12 and 14 is less than that of a semi-cylinder so that when their longitudinal edges are in engagement, sufficient clearance is provided between the lip portions 20 and 20' and the side wall 33 of the bushing 32 to permit the pulling members to be positioned in the recess 38 of the bushing with the lip portions 20 located at the bottom edge of the bushing 34. The drive bolt 16 is then inserted into the axial opening 28 separating the pulling members and moving the peripheral lip portions 20 and 20' to engage the undersurface of the bushing.

The drive bolt 16 is then turned, initially by hand, and thereafter by the use of an Allen wrench inserted into the hex recess 30 of the drive bolt, (FIG. 2) driving the pulling members 12 and 14 apart and forcing the peripheral lip into the gap between the bushing and the housing wall. When the tip 31 of the drive bolt 16 engages the housing wall, continued turning of the drive bolt 16 cuases the pulling members 12 and 14 to back up onto the drive member carrying with them the bushing.

When the pulling tool 10 is used to extract a bearing, a suitable tool is inserted into the aperture 26 provided in the head 19' of pulling member 14 to prevent rotation of the pulling members 12 and 14 as the drive member is turned.

It is pointed out that the tool 10 is dictated by the inner diameter of the bushing or bearing to be removed, and different size pulling tools would be provided for use with bushings or bearings of correspondingly different sizes.

Figure 7:
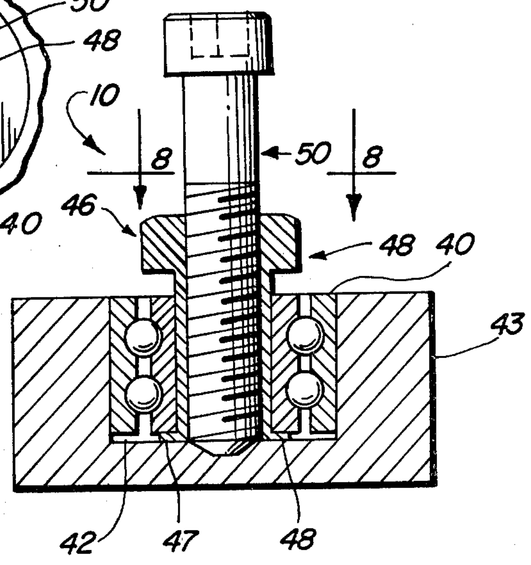
FIG. 7 is a side-sectional view of a second embodiment for a pulling tool provided by the present invention and which is shown in an application for extracting a bearing from a blind hole.

Referring to FIG. 7, a second embodiment of the pulling tool 10' is shown used to remove a bearing 40 from a blind hole 42 in a housing 43. The pulling tool 10' is generally similar to the pulling tool 10 and includes two pulling members 46 and 48 and drive bolt 16. The pulling members 46 and 48 are similar to pulling members 12 and 14, but are formed from bolt stock having a hex head. Thus, when the pulling members 46 and 48 are assembled together, they provide a hex configuration which can be gripped by an open ended wrench. As shown in FIG. 7, the peripheral lip portions 47 and 49 of the pulling elements engage the underside of the bearing inner race when the pulling tool is used to remove a bearing. The manufacture and use of the pulling tool 10' is similar to that described above with respect to pulling tool 10. Also, while pulling tool 10' is shown used to remove a bearing, it is apparent that such tool can also be used to remove bushings or other similar devices from blind holes.

The pulling tool provided by the present invention is a low cost unit with a minimum number of parts and can be used to extract either bushings or bearings from a blind hole. That is, the device can be used to remove complete bearing assemblies and is not limited to removing only the outer race of a bearing assembly.

Having thus disclosed in detail preferred embodiments of the invention, persons skilled in the art will be able to modify certain of the structure which has been disclosed and to substitute equivalent elements for those which have been illustrated; and it is, therefore, intended that all such modifications and substitutions be covered as they are embraced within the spirit and scope of the appended claims.

I claim:

1. A pulling tool for use in extracting a bushing or bearing device from a blind hole in a support member, said pulling tool comprising first and second pulling members, each being individually insertable into a central recess of the device to be extracted, each of said pulling members having an elongated shank portion having arcuately shaped, parallel inner and outer surfaces which define an axial channel along the inner surfaces of the shank portion, the inner surfaces of the shank portions of the two pulling members being threaded complementary over at least a portion thereof adjacent one end, and each of said pulling members having a lip portion extending outwardly from the outer surface of its shank portion at said one end, the radius of curvature of said shank portions being slightly less than that of a semi-cylinder and the lip portion of each pulling member extending between first and second points spaced a predetermined distance from its longitudinal edges to permit the shank portions of the two pulling members, with their longitundinal edges in engagement, to be inserted into said central recess of the device to be extracted, with their lip portions disposed adjacent to a rearward surface of the device, and a drive member having a head portion and a threaded shank for insertion into an axial opening defined by the shank portions of the two pulling members, when their longitudinal edges are in engagement, to drive the pulling members apart, moving their peripheral lip portions into engagement with said rearward surface, said threaded shank threadingly engaging the complementary threaded surfaces of the pulling members whereby as the drive member is turned, the pulling members are driven upwardly onto the threaded shank, carrying with them the device extracted, and at least one of said pulling members having a head portion extending from its shank portion and located externally of said central recess when the shank portion of said one pulling member is inserted into said recess, said head portion being formed with a recess on a side surface thereof to receive a tool for holding said pulling members to prevent rotation of said pulling members as said drive member is turned.

2. A pulling tool for use in extracting a bushing or bearing device from a blind hole in a support member, said pulling tool comprising first and second pulling members, each being individually insertable into a central recess of the device to be extracted, each of said pulling members having an elongated shank portion having arcuately shaped, parallel inner and outer surfaces which define an axial channel along the inner surfaces of the shank portion, the inner surfaces of the shank portions of the two pulling members being threaded complementary over at least a portion thereof adjacent one end, and each of said pulling members having a lip portion extending outwardly from the outer surface of its shank portion at said one end, the radius of curvature of said shank portions being slightly less than that of a semi-cylinder and the lip portion of each pulling member extending between first and second points spaced a predetermined distance from its longitudinal edges to permit the shank portions of the two pulling members, with their longitudinal edges in engagement, to be inserted into said central recess of the device to be extracted, with their lip portions disposed adjacent to a rearward surface of the device, each of said pulling members having a head portion extending from its shank portion at one end thereof and located externally of said central recess when the other ends of the shank portions of the pulling members are inserted into said recess, the configuration of the head portions of said two pulling members providing a substantially hex configuration when the pulling members are positioned together with their longitudinal edges in engagement, and a drive member having a head portion and a threaded shank for insertion into an axial opening defined by the head and shank portions of the two pulling members, when their longitudinal edges are in engagement, to drive the pulling members apart, moving their peripheral lip portions into engagement with said rearward surface, said threaded shank threadingly engaging the complementary threaded surfaces of the pulling members whereby as the drive member is turned, the pulling members are driven upwardly onto the threaded shank, carrying with them the device extracted, the head portions of said pulling members defining gripping surfaces to receive a tool for holding said pulling members to prevent rotation of said pulling members as said drive member is turned.

3. The pulling tool as set forth in claim 1 wherein said lip portions of said two pulling members engage a rearward edge of the inner race of a bearing device when the pulling tool is used to extract a bearing.

* * * * *